May 31, 1949.　　　　G. A. FLEISCHMANN　　　　2,471,735
SEMITRAILER VEHICLE WITH ELEVATING MEANS
Filed March 1, 1944　　　　　　　　　　　　　2 Sheets-Sheet 1
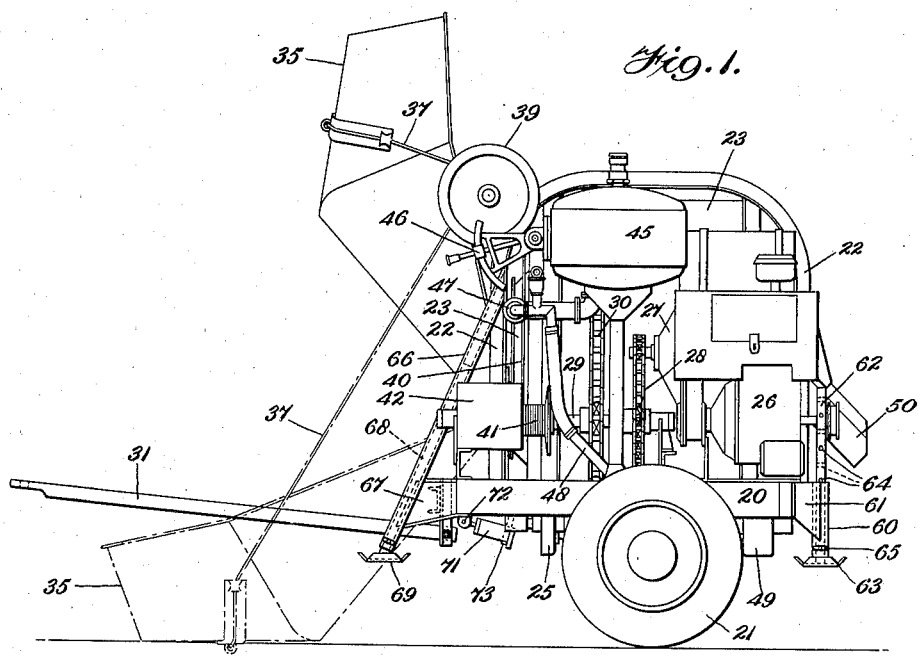
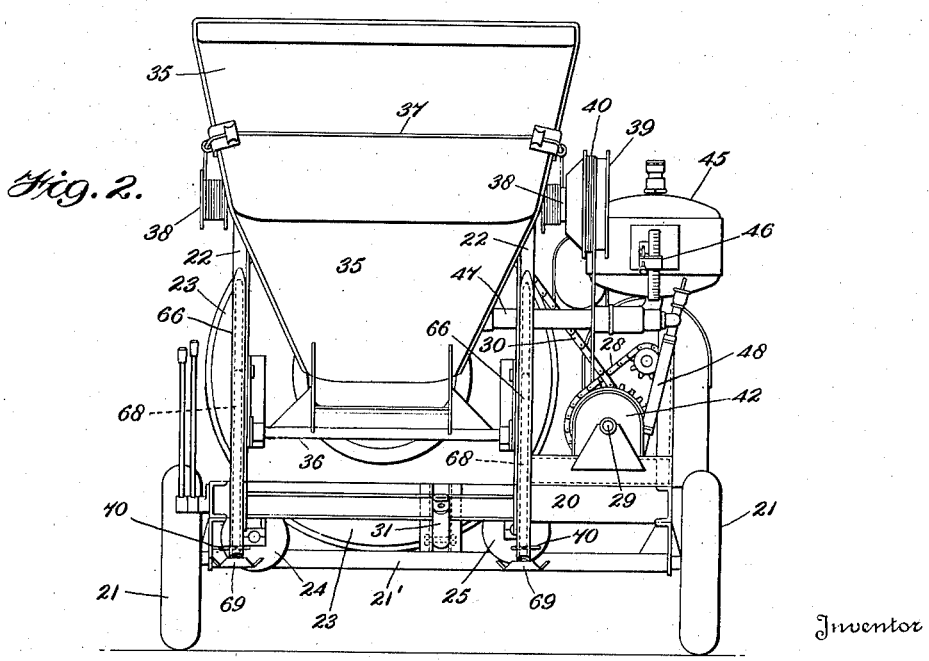
Inventor
George A. Fleischmann,
By
B. B. Collings
Attorney May 31, 1949.    G. A. FLEISCHMANN    2,471,735
SEMITRAILER VEHICLE WITH ELEVATING MEANS
Filed March 1, 1944    2 Sheets-Sheet 2

Inventor
George A. Fleischmann,
By
Attorney

Patented May 31, 1949

2,471,735

UNITED STATES PATENT OFFICE 2,471,735

SEMITRAILER VEHICLE WITH ELEVATING MEANS

George A. Fleischmann, Milwaukee, Wis., assignor to Chain Belt Company, Milwaukee, Wis., a corporation of Wisconsin Application March 1, 1944, Serial No. 524,595

2 Claims. (Cl. 254—86)

1

The invention relates to vehicles of the semi-trailer type and while for purposes of disclosure it has been illustrated and will be described in connection with a small readily portable concrete mixer of the type known to the trade as a "building" or "contractor's" mixer, it will be apparent to those skilled in the art that the principles involved may be applicable to vehicles of other types.

One of the objects of the invention is to provide means whereby a portable mixer of the semi-trailer type, designed and constructed to have a relatively low center of gravity to secure easier and safer towage over rough terrain at fairly good speeds, may be simply and effectively elevated when spotted at a job to provide for discharge of the mixture at a point higher than that attainable when the mixer is arranged for ground travel.

For purposes of disclosure the features above mentioned are illustrated in the accompanying drawings, forming a part of this specification, as incorporated into a commercial development of a light weight concrete mixer especially intended for transport by air in present day cargo airplanes. In the said drawings:

Figure 1 is a side elevational view of such a machine, in which the principles of the invention have been embodied;

Fig. 2 is an end elevational view of the parts shown in Fig. 1, as seen from the left of said figure.

Figure 6:
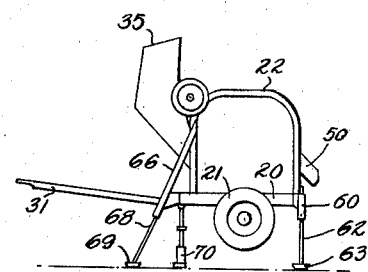
Figs. 3, 4, 5 and 6 are diagrammatic side elevational views, illustrating the mode of elevating the machine to secure the additional discharge height referred to above.

The machine illustrated in Figs. 1 and 2, is of the semi-trailer type and comprises a framework 20 normally supported by wheels 21 mounted upon an axle 21'. The said framework includes transversely spaced upright members 22 of substantially inverted U-shape, and a mixing drum 23 is rotatably mounted in the framework by supporting rollers 24 and 25. The said drum is driven by an internal combustion engine, the crank case of which is shown at 26, the drive being accomplished through transmission gearing contained within a housing 27, a chain and sprocket drive 28 to a countershaft 29, and a chain and sprocket drive 30 from the said countershaft to the drum 23. A power loader or charging skip 35 is provided at the forward end of the machine for charging batches of aggregates and cement into the drum 23, the said skip being carried by a shaft 36 journalled on the frame members 22.

2

The skip is movable between the full and broken line positions shown in Fig. 1 by the skip cable 37, winding drums 38 therefor, bull-wheel 39, hoisting cable 40 associated therewith, and winding drum 41, which latter is driven from countershaft 29 and controlled by suitable clutch and brake mechanism contained in a housing 42. A water tank 45 is supported by the framework and is provided with adjustable measuring mechanism 46 whereby variable predetermined quantities of water may be transferred from said tank by way of piping 47 to the drum 23 for incorporation into the concrete mixture. Water may be supplied to the tank 45 by piping 48 and a pump 49, driven from the engine 26. A discharge chute 50 is provided at the rear end of the machine.

As indicated above, the machine illustrated in Figs. 1 and 2 has been designed with a view to its transport by air in cargo planes, and to this end its weight has been reduced by as much as from one third to one half of that of comparable so-called "standard" machines. To offset this reduction in weight, so far as its stability is concerned when being towed from job to job over rough terrain at relatively rapid speeds, it further has been so designed as to keep its center of gravity as low as feasible. This results in the discharge point of its chute 50 being normally somewhat lower than that of the corresponding standard machines, and in order to be able to secure a discharge point at least as high as that of said standard machines, means have been provided whereby the present mixer may be readily bodily elevated and stabilized upon spotting it at the job.

Referring now more particularly to Figs. 1 and 2 inclusive, at each rear corner of the frame 20 a vertical sleeve 60 is rigidly secured to the frame members by a bracket 61 and slidably receives a vertical leg 62 which is provided at its lower end with a pad or foot 63. The legs 62 are provided with a series of vertically spaced transverse apertures 64 adapted to be selectively alined, as the legs are slid up and down in the sleeves, with a pair of complemental holes formed in the walls of the sleeve, whereby a readily removable pin or equivalent securing device 65 may be inserted therethrough to retain the members in any selected position relative to one another.

At the forward end of the machine a pair of longitudinally inclined tubes or sleeves 66 have their upper ends secured one to each of the upright frame members 22 and their lower ends secured to the frame 20 by brackets 67. Legs 68, similar to the legs 62, and provided with pads or feet 69, are slidably mounted in the tubes 66, there being a readily removable pin connection 70 between the two, similar to that described in connection with the sleeves 60 and legs 62, to maintain the selected vertical adjustment of the legs 68 in the tubes 66.

A screw, hydraulic or other suitable jack 71 has one of its elements pivotally secured as at 72 to the frame 20 and is normally maintained in an inoperative position, shown in Fig. 1 by a strap or catch 73.

The mode of employing the parts just described to elevate the mixer to secure a higher discharge point for the chute 50, will be clear from Figs. 3-6 inclusive, wherein the several steps of the operation are illustrated more or less diagrammatically. In this connection it may be said that while the weight of the mixer parts is more or less evenly distributed fore and aft of the axle of the supporting wheels 21 there is a slight preponderance forwardly thereof, whereby the tendency of the mixer is to tilt forwardly, or counterclockwise, as viewed in Figs. 3-6, and thus prevent it from exerting a lifting force upon the rear end of the towing vehicle, through the tow-pole or tongue 31.

Figure 3:
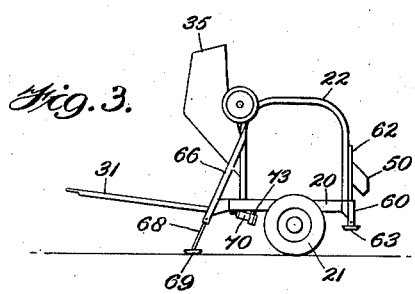
Figure 4:
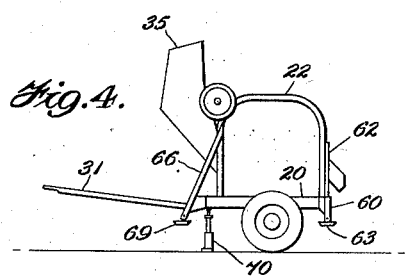

To facilitate the uncoupling of the said tow-pole from the towing vehicle upon reaching the vicinity of the job, the forward legs 68 may be extended and pinned in position with their feet 69 engaging the ground, as indicated in Fig. 3, and the mixer will thereby be prevented from tilting forwardly when the pole 31 is uncoupled. Upon uncoupling, the workman may then grasp the tow-pole and spot the mixer by hand, during which operation the pads or feet 69 will readily slide over the ground surface; and when spotted, the jack 70 is swung down to operative position and the legs 68 retracted, as shown in Fig. 4. In some cases, should the mixer have been sufficiently accurately spotted by the towing vehicle, the step of Fig. 3 may be omitted and the jack 70 lowered to the operative position of Fig. 4 without first lowering and then retracting the legs 68.

Figure 5:
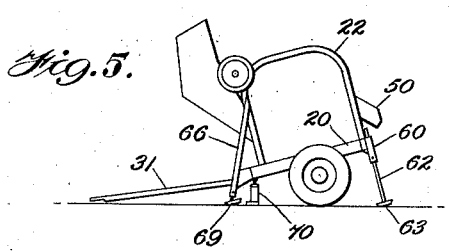

With the parts in the Fig. 4 position, the jack 70 is next manipulated to permit the mixer to tilt forwardly about its axle 21' and the rear legs 62 are extended and pinned, as shown in Fig. 5. The action of the jack is then reversed to again raise the forward end of the mixer, with the feet 63 acting as fulcrums, and when the frame 20 is substantially level the legs 68 are again extended and pinned. The parts are thus brought to the positions shown in Fig. 6, with the mixer being firmly supported by the four legs 62, 68 and the discharge point of the chute 50 being materially higher than when the mixer is supported by the ground engaging wheels 21, as in Fig. 3. The above operations may all be accomplished by a single workman.

What is claimed is:

1. In a vehicle of the semi-trailer type, the combination of a frame; a load carrying receptacle mounted thereby and having a discharge opening; a pair of wheels having axle means supporting said frame intermediate its ends for longitudinal tilting movements in each direction; extensible legs carried by one end of the frame for adjustment to and from ground engaging position; a ground engaging frame raising and lowering device adjacent the other end of the frame, whereby the latter may be tilted about said axle means, said legs then extended to and secured in ground engaging position, and the frame then tilted in the opposite direction by said device on said legs as fulcrums to level the frame with the discharge opening of said load carrying receptacle in an elevated position; and extensible legs at the other end of the frame, adjustable to engage the ground and support such end of the vehicle in said elevated position with its wheels clear of the ground.

2. In a vehicle of the semi-trailer type, the combination of a frame; a load carrying receptacle mounted thereby and having a rear discharge opening; a pair of wheels having axle means supporting said frame intermediate its ends for longitudinal tilting movements in each direction; extensible legs carried by the forward and rearward ends of the frame for adjustment to and from ground engaging positions; and a jack carried by the forward portion of the frame for movement to and from an operative ground engaging position, in which position it may be actuated to tilt the frame and thereby elevate the rearward end thereof, the rearward legs then extended to and secured in ground engaging position, the frame then tilted in an opposite direction by the jack on said rearward legs as fulcrums to a level position, and the forward legs then extended to and secured in ground engaging position to support the vehicle with the discharge opening of its receptacle in an elevated position and with its wheels clear of the ground.

GEORGE A. FLEISCHMANN.

REFERENCES CITED

The following references are of record in the file of this patent:

UNITED STATES PATENTS

| Number | Name | Date |
| --- | --- | --- |
| 864,451 | Davis | Aug. 27, 1907 |
| 1,198,530 | Droughton | Sept. 19, 1916 |
| 1,477,543 | Daniel | Dec. 18, 1923 |
| 1,713,222 | Greene | May 14, 1929 |
| 1,727,430 | Gilkison | Sept. 10, 1929 |
| 1,753,831 | Lichtenberg | Apr. 8, 1930 |
| 1,770,532 | Ruef | July 15, 1930 |
| 2,285,313 | Tagliaboschi | June 2, 1942 |